US012441361B2

(12) United States Patent
Dolgov et al.

(10) Patent No.: US 12,441,361 B2
(45) Date of Patent: Oct. 14, 2025

(54) METHOD AND APPARATUS FOR OPERATING A VEHICLE FOR HIGHLY AUTOMATED DRIVING, AND VEHICLE FOR HIGHLY AUTOMATED DRIVING

(71) Applicant: Robert Bosch GmbH, Stuttgart (DE)

(72) Inventors: Maxim Dolgov, Renningen (DE); Raquel Tirach, Llupia (FR); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 120 days.

(21) Appl. No.: 18/450,244

(22) Filed: Aug. 15, 2023

(65) Prior Publication Data

US 2024/0067211 A1 Feb. 29, 2024

(30) Foreign Application Priority Data

Aug. 24, 2022 (DE) ..................... 10 2022 208 742.9

(51) Int. Cl.
*B60W 60/00* (2020.01)

(52) U.S. Cl.
CPC ....... *B60W 60/001* (2020.02); *B60W 2420/00* (2013.01); *B60W 2552/00* (2020.02); *B60W 2554/00* (2020.02)

(58) Field of Classification Search
CPC ........... B60W 60/001; B60W 2552/00; B60W 2554/00; B60W 2420/00
See application file for complete search history.

(56) References Cited

U.S. PATENT DOCUMENTS

| 2021/0141093 | A1* | 5/2021 | Kim ..................... G05D 1/0231 |
| 2022/0198935 | A1* | 6/2022 | Adams ............... B60W 60/001 |
| 2022/0290991 | A1* | 9/2022 | Liebner ............. G01C 21/3804 |
| 2023/0043236 | A1* | 2/2023 | Zhang ..................... G01S 19/47 |
| 2024/0094009 | A1* | 3/2024 | Bosse ................... G01C 21/32 |

FOREIGN PATENT DOCUMENTS

| DE | 102016214030 A1 | 2/2018 |
| DE | 102018203583 A1 | 9/2019 |

* cited by examiner

*Primary Examiner* — Peter D Nolan
*Assistant Examiner* — Mikko Okechukwu Obioha
(74) *Attorney, Agent, or Firm* — NORTON ROSE FULBRIGHT US LLP (57) ABSTRACT

A method for operating a vehicle for highly automated driving. The method includes a step of reading sensor data that comprise trip data of the vehicle from at least one acceleration sensor, at least one position sensor, and a velocity sensor, infrastructure data of infrastructure elements in a predefined environment of the vehicle from at least one environmental sensor, and object data of recognized traffic objects in the predefined environment from the environmental sensor. An environmental model for behavior planning and maneuver planning of the vehicle within the predefined environment is determined. The environmental model is determined by simultaneous localization and mapping using the sensor data and a factor graph into which the sensor data are integrated as factors. The environmental model is output to an interface to a planning device for behavior planning and maneuver planning of the vehicle.

8 Claims, 5 Drawing Sheets

METHOD AND APPARATUS FOR OPERATING A VEHICLE FOR HIGHLY AUTOMATED DRIVING, AND VEHICLE FOR HIGHLY AUTOMATED DRIVING

CROSS REFERENCE

The present application claims the benefit under 35 U.S.C. § 119 of German Patent Application No. DE 10 2022 208 742.9 filed on Aug. 24, 2022, which is expressly incorporated herein by reference in its entirety.

FIELD

The present invention relates to an apparatus and a method for operating a vehicle for highly automated driving, and a vehicle. The subject matter of the present invention is also a computer program.

BACKGROUND INFORMATION

Environmental modeling and localization for a basis for behavior planning and maneuver planning for automated vehicles and mobile robots. For example, while robot vacuum cleaners often provide a simple occupancy grid, a so-called occupancy map, robots and vehicles may, for example, require a semantic map and tracking of perceived objects in order to be able to plan safe maneuvers. In this respect, two approaches are in particular prevalent with regard to the modeling of the static environment, such as lanes and lane markings, signage, etc. The first approach is based on the presence of a high-definition map (HD-MAP) to which the mobile agent can highly accurately localize itself. Drivable areas, lanes, lane markings, pedestrian areas, prescribed velocities, etc. can be stored in such a map and can be available in current form to the agent during operation. However, such an HD map should always be in current form. For example, deviations due to vegetation or weather may in some circumstances lead to the mobile agent no longer being able to localize correctly to the HD map and maneuver planning being more difficult as a result. The second approach in particular provides that only at most one navigation map (SD map) is present and the agent forms a model of its environment at runtime. In this case, the challenge may, for example, be to have available a locally consistent model of the environment that should not have any jumps. Such jumps could otherwise, in some circumstances, lead to tracks of the other road users breaking off or having a negative effect on a control of the agent.

SUMMARY

A method, furthermore an apparatus using this method, a vehicle for highly automated driving, and finally a corresponding computer program are provided. By the measures disclosed herein, advantageous developments and improvements of the apparatus and method disclosed herein are possible.

According to example embodiments of the present invention, locally consistent, factor-graph-based environmental modeling can in particular be provided for operating a vehicle for highly automated driving. In other words, creation of a locally consistent environment model for mobile agents or, in other words, vehicles for highly automated driving can, for example, be enabled, wherein the environmental model can form a basis for behavior planning and maneuver planning of the mobile agent. In particular, it can be provided in this case that other road users, a dynamic of the vehicle and of the infrastructure, such as lane markings, signage, etc., are tracked in a factor graph. In this way, graph-based simultaneous localization and mapping (SLAM) and use of graph optimization for sensor data fusion can in particular be expanded. According to example embodiments of the present invention, factor graph optimization may, for example, be used for environmental modeling of a mobile agent or, in other words, of a vehicle for highly automated driving. In this case, the GTSAM algorithm, in particular the iSAM2 algorithm, may be used, for example. This makes it possible to build a locally consistent environmental model, which may have deviations in terms of global reference but may be precise for behavior planning and maneuver planning of the vehicle since, inter alia, it does not have any jumps and errors in the relevant environment of approximately 200-300 meters around the vehicle are sufficiently small. In this way, the vehicle can, for example, be operated without an HD map, wherein such a mode can also be referred to as mapless.

According to an example embodiment of the present invention, a method for operating a vehicle for highly automated driving is provided, wherein the method comprises the following steps:

reading sensor data from an interface to a plurality of vehicle sensors of the vehicle, wherein the sensor data comprise trip data of the vehicle from at least one acceleration sensor, at least one position sensor, and at least one velocity sensor, infrastructure data of infrastructure elements in a predefined environment of the vehicle from at least one environmental sensor, and object data of recognized traffic objects in the predefined environment from the at least one environmental sensor;

determining an environmental model for behavior planning and maneuver planning of the vehicle within the predefined environment of the vehicle, wherein the environmental model is determined by simultaneous localization and mapping using the sensor data and a factor graph, wherein the sensor data are integrated as factors in the factor graph; and outputting the environmental model to an interface to a planning device for behavior planning and maneuver planning of the vehicle, wherein the planning device is designed to operate the vehicle, using the environmental model.

The vehicle may be a motor vehicle, e.g., a passenger vehicle, truck or other utility vehicle, a robot or the like. The infrastructure elements may, for example, be elements of small extension, such as posts, signs, trees, etc., and, additionally or alternatively, elements of greater extension, such as lane markings of lanes and the like. The traffic objects may be foreign vehicles and, additionally or alternatively, traffic obstructions. The at least one environmental sensor may be designed as a vehicle camera, in particular a video camera. The planning device can be designed to control at least one assistance device of the vehicle and, additionally or alternatively, at least one actuator for longitudinal control and/or lateral control of the vehicle, using the environmental model.

According to one embodiment of the present invention, in the step of determining, sensor data integrated as factors in the factor graph can be continuously marginalized if the sensor data satisfy a predefined irrelevance criterion regarding a temporal and/or local validity of the sensor data. The irrelevance criterion may, for example, have a threshold value with regard to a time duration since a sensing time point of the sensor data. Additionally or alternatively, the irrelevance criterion for a current environment may have a geographic boundary with regard to positions or coordinates contained in the sensor data. Such an embodiment offers the advantage that real-time operation can be enabled since a variable of the factor graph can be bounded. For this purpose, a time threshold value, e.g., 20 seconds, may, for example, be used, based on which measurements or sensor data that are too old can be marginalized, wherein the same can thus no longer be contained in the factor graph and, additionally or alternatively, an information content of the marginalized measurements can be retained in that it can remain contained in the factor graph as priori information. Thus, it can in particular be provided that the tracking of the other road users, of the dynamics of the vehicle, and of the infrastructure is carried out in a factor graph, which is continuously marginalized during operation, wherein a so-called pruning or cutting off or removing of the no longer relevant information based on, for example, a time threshold value can be carried out.

According to an example embodiment of the present invention, in the step of reading, sensor data may also be read that comprises a pose, a longitudinal velocity, a longitudinal acceleration, and a rotation rate of the vehicle as trip data. In this case, in the step of determining, the trip data can be associated with a predefined motion model of the vehicle and can be integrated as factors into the factor graph. The motion model may, for example, be the so-called bicycle model or another kinematic model. Such an embodiment offers the advantage that meaningful states of the own vehicle or ego vehicle can be integrated into the factor graph and a reliable and accurate environmental model can thus be determined.

Furthermore, in the step of reading, sensor data can be read that comprise positions of infrastructure elements relative to the vehicle as infrastructure data. In this case, in the step of determining, the infrastructure data can be integrated as factors into the factor graph and associated with the trip data of the vehicle. Such an embodiment offers the advantage that little-extensive infrastructure elements, such as posts, signs, trees, etc., can be integrated into the factor graph and a reliable and accurate environmental model can thus be determined.

In addition, in the step of reading, sensor data can be read that comprise poses, dimensions and, additionally or alternatively, clothoids of infrastructure elements relative to the vehicle as infrastructure data. In this case, in the step of determining, the infrastructure data can be integrated as factors into the factor graph. Such an embodiment offers the advantage that extensive infrastructure elements, such as lane markings, etc., can be integrated into the factor graph and a reliable and accurate environmental model can thus be determined.

Moreover, according to an example embodiment of the present invention, in the step of reading, sensor data can be read that comprise poses, velocities, accelerations, and dimensions of recognized traffic objects relative to the vehicle as object data. In this case, in the step of determining, the object data can be associated with a predefined motion model for traffic objects and predicted object data can be generated using a prediction rule. In so doing, the object data and the predicted object data can be integrated as factors into the factor graph. Such an embodiment offers the advantage that current and estimated future states of traffic objects, such as foreign vehicles, etc., can be integrated into the factor graph and a reliable and accurate environmental model can thus be determined.

This method can be implemented, for example, in software or hardware or in a mixed form of software and hardware, for example in a control device or an apparatus.

The present invention furthermore provides an apparatus which is designed to carry out, control, or implement, in corresponding devices, the steps of a variant of the method presented here. The object underlying the present invention can also be achieved quickly and efficiently by this embodiment variant of the present invention in the form of an apparatus.

For this purpose, the apparatus can comprise at least one computing unit for processing signals or data, at least one storage unit for storing signals or data, at least one interface to a sensor or an actuator for reading sensor signals from the sensor or for outputting data or control signals to the actuator, and/or at least one communication interface for reading or outputting data embedded in a communication protocol. The computing unit may, for example, be a signal processor, a microcontroller or the like, wherein the memory unit may be a flash memory, an EEPROM, or a magnetic memory unit. The communication interface can be designed to read or output data in a wireless and/or wired manner, wherein a communication interface capable of reading or outputting wired data can, for example, electrically or optically read said data from a corresponding data transmission line or output said data into a corresponding data transmission line.

An apparatus is understood in the present case to mean an electrical device that processes sensor signals and outputs control signals and/or data signals as a function thereof. The apparatus can comprise an interface in the form of hardware and/or software. In the case of a hardware design, the interfaces may, for example, be part of a so-called system ASIC, which contains various functions of the apparatus. However, it is also possible that the interfaces are separate integrated circuits or consist at least in part of discrete components. In the case of a software design, the interfaces can be software modules that are, for example, present on a microcontroller in addition to other software modules.

A vehicle for highly automated driving is also presented, wherein the vehicle has the following features:
an embodiment of an apparatus mentioned herein;
the plurality of vehicle sensors; and
the planning device for behavior planning and maneuver planning, wherein the apparatus, the vehicle sensors, and the planning device are connected to one another for data transmission.

In connection with such a vehicle, an embodiment of an apparatus mentioned herein can be used advantageously to operate the vehicle and, in particular, to generate and provide an environmental model for operating the vehicle.

A computer program product or a computer program with program code that can be stored on a machine-readable carrier or storage medium, such as a semiconductor memory, a hard disk memory, or an optical memory, and that is used to carry out, implement, and/or control the steps of the method according to one of the embodiments described above is advantageous as well, in particular when the program product or program is executed on a computer or an apparatus.

Exemplary embodiments of the present invention disclosed herein are shown in the figures and explained in greater detail in the following description.

DETAILED DESCRIPTION OF EXAMPLE EMBODIMENTS

In the following description of favorable exemplary embodiments of the present invention, identical or similar reference signs are used for the elements shown in the various figures and acting similarly, wherein a repeated description of these elements is dispensed with.

Figure 1:
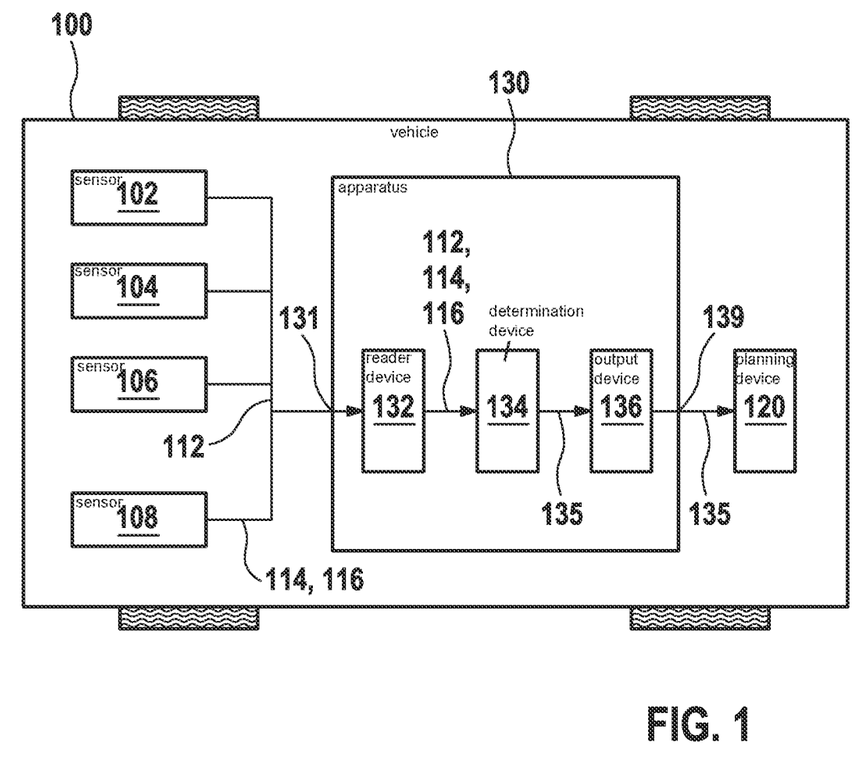
FIG. 1 shows a schematic representation of a vehicle for highly automated driving with an apparatus according to an exemplary embodiment of the present invention.

FIG. 1 shows a schematic representation of a vehicle 100 for highly automated driving with an apparatus 130 according to an exemplary embodiment. The vehicle 100 is a mobile agent in the form of a robot or a motor vehicle, e.g., a passenger vehicle, a truck, or another utility vehicle. The vehicle 100 is designed to drive in a highly automated manner.

In the representation of FIG. 1, a plurality of vehicle sensors 102, 104, 106, and 108, a planning device 120 for behavior planning and maneuver planning for the vehicle 100, and the apparatus 130 are shown of the vehicle 100. The apparatus 130 is designed to operate the vehicle 100 or to generate and provide operational data for operating the vehicle 100. The apparatus 130 may also be referred to as an operating apparatus. The apparatus 130 is connected to the vehicle sensors 102, 104, 106, and 108 and to the planning device 120 for data transmission or signal transmission.

According to the exemplary embodiment shown here, the vehicle sensors 102, 104, 106, and 108 comprise, by way of example, only an acceleration sensor 102, a position sensor 104, a velocity sensor 106, and an environmental sensor 108. The acceleration sensor 102, the position sensor 104, and the velocity sensor 106 are designed to sense and provide trip data 112 of the vehicle 100 in the form of acceleration measurement values, position measurement values, and velocity measurement values. The environmental sensor 108 is designed to sense and provide infrastructure data 114 of infrastructure elements in a predefined environment of the vehicle and object data 116 of recognized traffic objects in the predefined environment in the form of environmental measurement values, in particular in the form of image data or camera data, lidar data, radar data, or other measurement data. The vehicle sensors 102, 104, 106, and 108 are thus designed to provide sensor data, which comprise the trip data 112, the infrastructure data 114, and the object data 116.

The apparatus 130 for operating, or the operating apparatus 130, comprises a reader device 132, a determination device 134, and an output device 136. Furthermore, the apparatus 130 comprises an input interface 131 and an output interface 139. In this case, the reader device 132 is designed to read sensor data, which comprise the trip data 112, the infrastructure data 114, and the object data 160, from the input interface 131 to the vehicle sensors 102, 104, 106, and 108. Furthermore, the reader device 132 is designed to pass the sensor data to the determination device 134.

The determination device 134 of the apparatus 130 is designed to determine an environmental model 135 for behavior planning and maneuver planning of the vehicle 100 within the predefined environment of the vehicle 100. In this case, the determination device 134 is designed to determine the environmental model 135 by simultaneous localization and mapping using the sensor data and a factor graph, wherein the sensor data are integrated as factors in the factor graph. In other words, the determination device 134 is designed in this case to parameterize the factor graph with the sensor data. Furthermore, the determination device 134 is designed to pass the environmental model 135 in signal form to the output device 136. The output device 136, in turn, is designed to output the environmental model to the output interface 139 to the planning device 120. The planning device 120 is designed to operate the vehicle 100, using the environmental model 135. For this purpose, the planning device 120 is, for example, designed to control at least one actuator for longitudinal control and/or lateral control of the vehicle 100 and, additionally or alternatively, at least one assistance system of the vehicle 100, using the environmental model 135.

According to an exemplary embodiment, the determination device 134 is designed to continuously marginalize sensor data integrated as factors in the factor graph, if the sensor data satisfy a predefined irrelevance criterion regarding a temporal and/or local validity of the sensor data.

The factor graph in particular is discussed in more detail with reference to the following figures.

Figure 2:
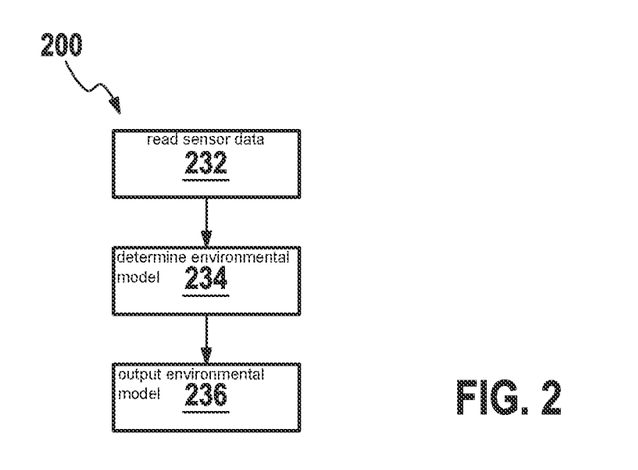
FIG. 2 shows a flow chart of an exemplary embodiment of a method for operating a vehicle for highly automated driving according to the present invention.

FIG. 2 shows a flow chart of an exemplary embodiment of a method 200 for operating a vehicle for highly automated driving. The method 200 for operating can be performed by means of and/or using the apparatus of FIG. 1 or a similar apparatus. The method 200 for operating comprises a step 232 of reading, a step 234 of determining, and a step 236 of outputting.

In step 232 of reading, sensor data are read from an interface to a plurality of vehicle sensors of the vehicle. The sensor data comprise trip data of the vehicle from at least one acceleration sensor, at least one position sensor, and at least one velocity sensor, furthermore infrastructure data of infrastructure elements in a predefined environment of the vehicle from at least one environmental sensor, and also object data of recognized traffic objects in the predefined environment from the at least one environmental sensor.

In step 234 of determining, an environmental model for behavior planning and maneuver planning of the vehicle within the predefined environment of the vehicle is determined. The environmental model is in this case determined by simultaneous localization and mapping using the sensor data and a factor graph. The sensor data are integrated as factors in the factor graph.

In step 236 of outputting, the environmental model is output to an interface to a planning device for behavior planning and maneuver planning of the vehicle. The planning device is designed to operate the vehicle, using the environmental model.

According to an exemplary embodiment, in step 234 of determining, sensor data integrated as factors in the factor graph are continuously marginalized if the sensor data satisfy a predefined irrelevance criterion regarding a temporal and/or local validity of the sensor data.

Figure 3:
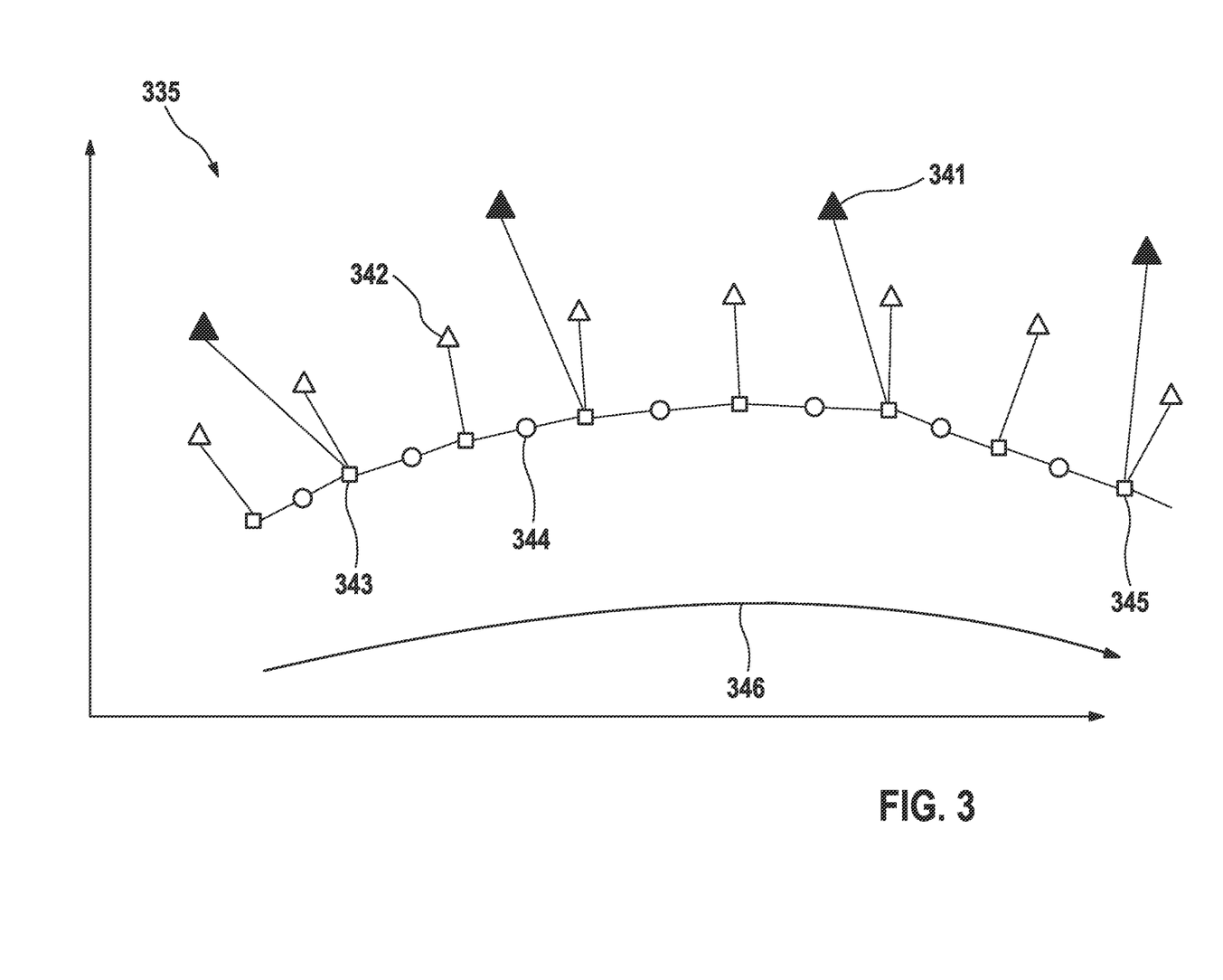
FIG. 3 shows a schematic representation of a factor graph according to an exemplary embodiment of the present invention.

FIG. 3 shows a schematic representation of a factor graph 335 according to an exemplary embodiment. The factor graph 335 can be used in connection with the operating apparatus or apparatus of FIG. 1 or a similar apparatus and/or the method of FIG. 2 or a similar method. The factor graph 335 is drawn into any fixed coordinate system. In the representation of FIG. 3, only the aforementioned trip data of the sensor data are integrated as factors in the factor graph 335. The trip data describe states of the vehicle. In the representation of FIG. 3, the factor graph 335 is thus shown in a partially completed state or, in other words, with some of its factors.

More specifically, position data or low-frequency GPS measurements 341, which are provided by the position sensor of the vehicle, dynamic measurements 342 of the vehicle, which are provided by the acceleration sensor and/or the velocity sensor of the vehicle, past states 343 of the vehicle at past time points, a predefined motion model 344 of the vehicle, a current state 345 of the vehicle at a current time point, and a direction of movement 346 of the vehicle are drawn into the factor graph 335. In this case, the GPS measurements 341 and the dynamic measurements 342 are associated with respective states 343 and 345 of the vehicle, wherein adjacent states 343 and 345 are respectively associated with one another via the motion model 344.

In this case, in the step of reading of the method for operating, or by means of the reader device of the operating apparatus, sensor data are read that comprise a pose, a longitudinal velocity, a longitudinal acceleration, and a rotation rate of the vehicle as trip data. Furthermore, in the step of determining of method for operating, or by means of the determination device of the operating apparatus, the trip data are associated with the predefined motion model 344 of the vehicle and integrated as factors into the factor graph 335.

In other words, FIG. 3 shows a factor graph 335 of factors for IMU measurements or measurements of an inertial measurement unit or dynamic measurements 342, GPS measurements 341, the motion model 344 of the agent, and for the states 343 and 345 of the agent, i.e., current state 345 and past states 343. A state 343, 345 of the vehicle or mobile agent is represented by its pose, longitudinal velocity, longitudinal acceleration, and rotation rate, i.e., by [x, y, θ, v, a, θ̇]. Dynamic measurements 342 from an inertial measurement unit (IMU) or from the acceleration sensor are used, which measurements may also be referred to as dynamics measurement factor and are pre-integrated by a filter between the time points at which the dynamic measurements 342 are integrated into the factor graph 335. The dynamic measurement 342 is present in the form [$v_x$, $v_y$, $a_x$, $a_y$, θ̇]-velocity and acceleration in the longitudinal and lateral directions, and rotation rate. For the global referencing of the vehicle, GPS measurements 341 are used, which are transformed into UTM (Universal Transverse Mercator) coordinates. The GPS measurement 341 is present in the form [x, y]-position of the vehicle. The states 343 and 345 of the vehicle are associated with the predefined motion model 344. For this purpose, the so-called bicycle model is, for example, assumed.

Figure 4:
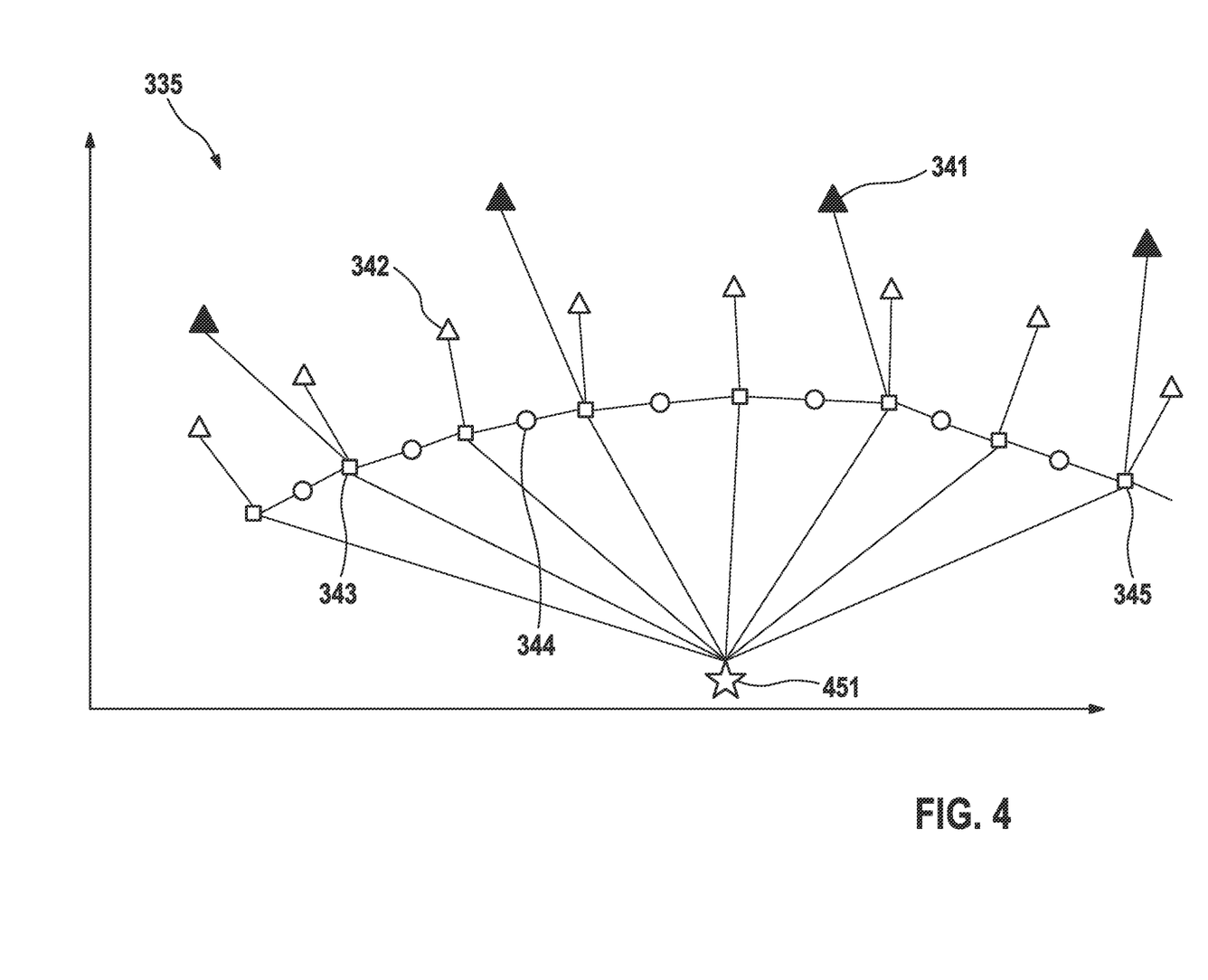
FIG. 4 shows a schematic representation of a factor graph according to an exemplary embodiment of the present invention.

FIG. 4 shows a schematic representation of a factor graph 335 according to an exemplary embodiment. In this case, the factor graph 335 in FIG. 4 corresponds to the factor graph of FIG. 3 with the exception that in FIG. 4, the direction of movement of the vehicle is omitted and infrastructure data in the form of a landmark measurement 451 of a non-extensive landmark are additionally integrated. The landmark measurement 451 of the non-extensive landmark, or landmark of small extension, is associated with the states 343 and 345 of the vehicle and thus with the trip data of the vehicle.

In this case, in the step of reading of the method for operating, or by means of the reader device of the operating apparatus, sensor data are read that comprise a landmark measurement 451 or positions of infrastructure elements or of landmarks relative to the vehicle as infrastructure data. Furthermore, in the step of determining of the method for operating, or by means of the determination device of the operating apparatus, the infrastructure data are integrated as factors into the factor graph 335 and associated with the trip data of the vehicle.

In other words, FIG. 4 shows the factor graph of FIG. 3 expanded by a factor for a landmark measurement 451. Landmark measurements 451 of non-extensive landmarks from a video sensor or environmental sensor of the vehicle are thus used, wherein non-extensive landmarks may, for example, be posts, signs, trees, etc. After processing in the sensor, the landmark measurements 451 are present in the form [x, y]. Since the position of these landmarks is constant, they are only once integrated into the factor graph 335 and associated with the state 343, 345 of the vehicle from which they are perceived. The association of the landmark measurements 451 is made hard, for example using the global nearest neighbor (GNN) algorithm. Alternatively, a soft association may be used for this purpose, for example using the joint probabilistic data association (JPDA) algorithm.

Figure 5:
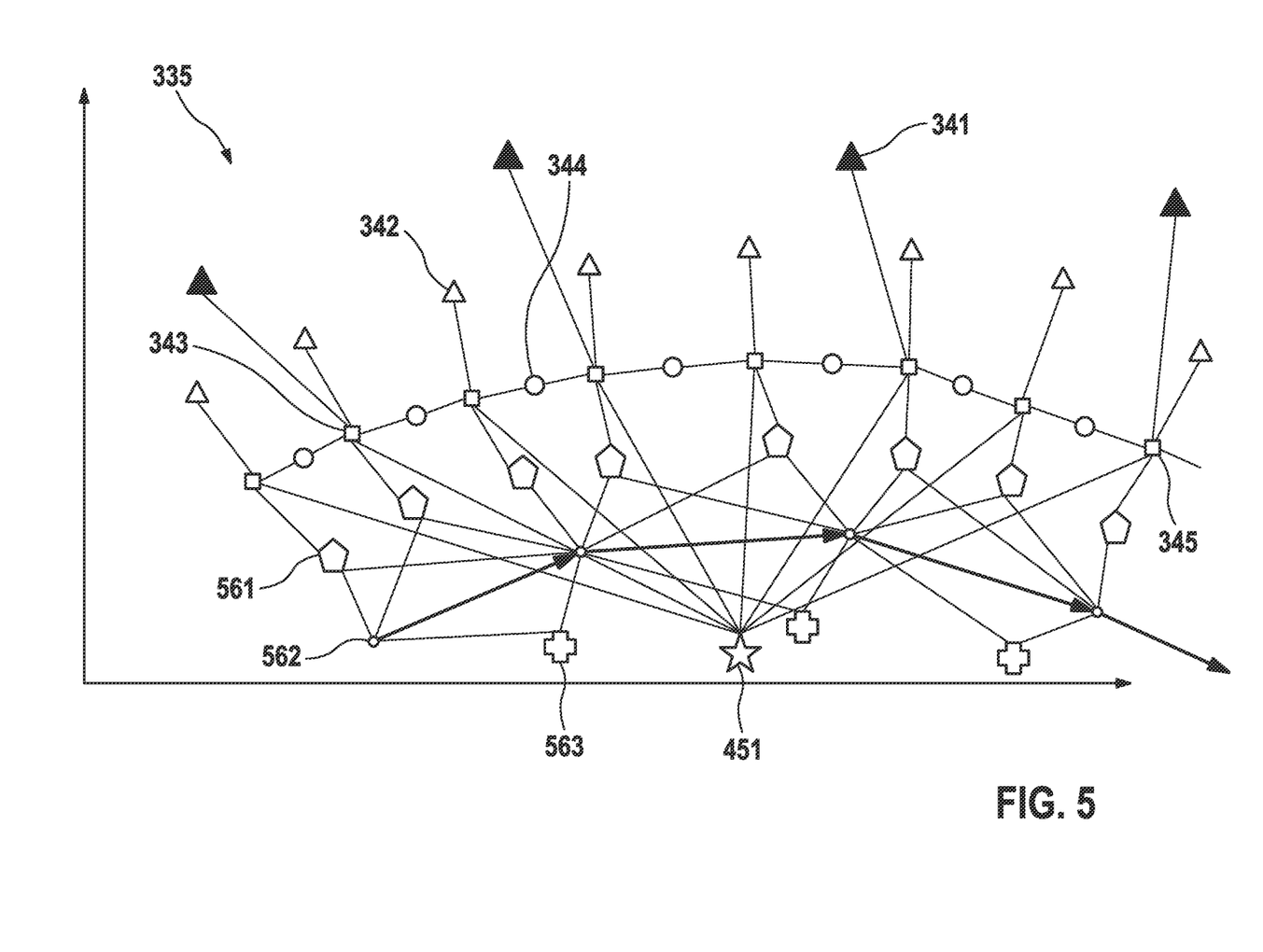
FIG. 5 shows a schematic representation of a factor graph according to an exemplary embodiment of the present invention.

FIG. 5 shows a schematic representation of a factor graph 335 according to an exemplary embodiment. The factor graph 335 in FIG. 5 corresponds to the factor graph of FIG. 4 with the exception that in FIG. 5, additional clothoid measurements 561, line segments 562, and line model factors 563 are integrated as infrastructure data of extensive landmarks, or landmarks of larger dimension, into the factor graph 335.

In this case, in the step of reading of the method for operating, or by means of the reader device of the operating apparatus, sensor data are read that comprise poses, dimensions, and/or clothoids or clothoid measurements 561 from infrastructure elements relative to the vehicle as infrastructure data. Furthermore, in the step of determining of the method for operating, or by means of the determination device of the operating apparatus, the infrastructure data are integrated as factors into the factor graph 335.

In other words, FIG. 5 shows an expansion of the factor graph of FIG. 4 by infrastructure data of extensive landmarks, here, for example, lane marking measurements 561, 562, 563. Using the factor graph 335 shown in FIG. 5, extensive landmarks, here, for example, lane markings, are thus also tracked. The lane markings are broken down into associated line segments 562. Each line segment 562 is described by the state [x, y, θ, l]-pose and length. The line segments 562 are associated with one another by line model factors 563, which require the orientation and connection point of two successive line segments 562 to be adhered to. The weighting of the line model factor 563 in the factor graph 335 affects the possible curvature of the lane markings in the road model. The measurements of the lines from the video sensor or environmental sensor of the vehicle is in the form of clothoid measurements 561. In order to make an association of the clothoids or clothoid measurements 561 with the line segments 562, the latter are scanned and the points are subsequently projected onto the line segments 562. In this way, the error to be minimized by the factor graph optimization in the piecewise Frenet coordinate system of the lane consisting of the line segments 562 is ascertained.

Figure 6:
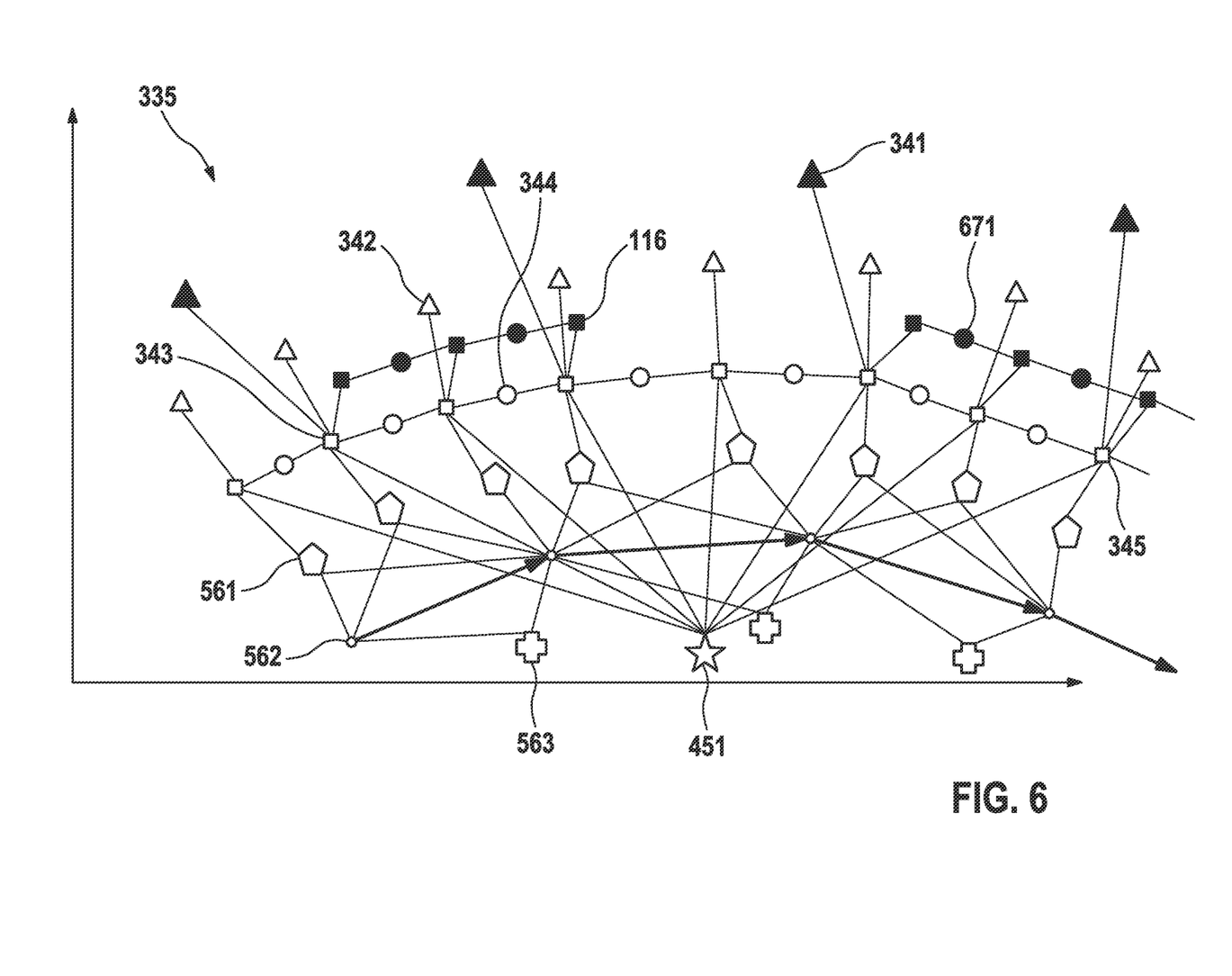
FIG. 6 shows a schematic representation of a factor graph according to an exemplary embodiment of the present invention.

FIG. 6 shows a schematic representation of a factor graph 335 according to an exemplary embodiment. The factor graph 335 in FIG. 6 corresponds to the factor graph of FIG. 5 with the exception that in FIG. 6, object data 116 and a predefined motion model 671 for traffic objects are additionally integrated into the factor graph 335.

In this case, in the step of reading of the method for operating, or by means of the reader device of the operating apparatus, sensor data are read that comprise poses, velocities, accelerations, and dimensions of recognized traffic objects relative to the vehicle as object data 116. Furthermore, in the step of determining of the method for operating, or by means of the determination device of the operating apparatus, the object data 116 are associated with a predefined motion model 671 for traffic objects and, optionally, predicted object data are additionally generated using a prediction rule, wherein the object data 116 and optionally also the predicted object data are integrated as factors into the factor graph 335.

In other words, FIG. 6 shows the completed factor graph 335 even with factors for detected objects or recognized traffic objects, in this case two, wherein there is only one recognized object at the current time point. A bicycle model is likewise used as the motion model 671 for traffic objects, and a prediction for a specified time is carried out. With the object data 116, detections of the objects or of the recognized traffic objects, which are present in the ego coordinate system of the vehicle after sensor processing, are thus integrated into the factor graph 335. The detections or object data 116 are in the form [x, y, θ, $v_x$, $v_y$, $a_x$, $a_y$, l, w]-pose of the traffic object relative to the vehicle, velocity, and acceleration in the ego coordinate system, as well as length and width. The association of the detections or object data 116 with the objects in the graphs is made either hard (GNN) or soft (JPDA). The advantage of tracking perceived objects or recognized traffic objects in the factor graph 335 is that it can be explicitly modeled that vehicles cannot drive through one another. With traditional recursive filters, such as a Kalman filter, this is possible only with heuristics.

What is claimed is:

1. A method for operating a vehicle for highly automated driving, the method comprising the following steps:
   reading sensor data from an interface to a plurality of vehicle sensors of the vehicle, wherein the sensor data include trip data of the vehicle from at least one acceleration sensor, at least one position sensor, and at least one velocity sensor, infrastructure data of infrastructure elements in a predefined environment of the vehicle from at least one environmental sensor, and object data of recognized traffic objects in the predefined environment from the at least one environmental sensor;
   determining an environmental model for behavior planning and maneuver planning of the vehicle within the predefined environment of the vehicle, wherein the environmental model is determined by simultaneous localization and mapping using the sensor data and a factor graph, wherein the sensor data are integrated as factors in the factor graph; and
   outputting the environmental model to an interface to a planning device for behavior planning and maneuver planning of the vehicle, wherein the planning device is configured to operate the vehicle, using the environmental model;
   wherein, in the determining step, sensor data integrated as factors in the factor graph are continuously marginalized when the sensor data satisfy a predefined irrelevance criterion regarding a temporal and/or local validity of the sensor data.

2. The method according to claim 1, wherein, in the reading step, sensor data are read that include a pose, a longitudinal velocity, a longitudinal acceleration, and a rotation rate of the vehicle as the trip data, wherein, in the determining step, the trip data are associated with a predefined motion model of the vehicle and integrated as factors into the factor graph.

3. The method according to claim 1, wherein, in the reading step, sensor data are read that include positions of infrastructure elements relative to the vehicle as the infrastructure data, wherein, in the determining step, the infrastructure data are integrated as factors into the factor graph and associated with the trip data of the vehicle.

4. The method according to claim 1, wherein, in the reading step, sensor data are read that include poses, and/or dimensions, and/or clothoids, of infrastructure elements relative to the vehicle as the infrastructure data, wherein, in the determining step, the infrastructure data are integrated as factors into the factor graph.

5. The method according to claim 1, wherein, in the reading step, sensor data are read that include poses, velocities, accelerations, and dimensions, of recognized traffic objects relative to the vehicle as object data, wherein, in determining step, the object data are associated with a predefined motion model for traffic objects and predicted object data are generated using a prediction rule, wherein the object data and the predicted object data are integrated as factors into the factor graph.

6. An apparatus configured to operate a vehicle for highly automated driving, the apparatus configured to:
   read sensor data from an interface to a plurality of vehicle sensors of the vehicle, wherein the sensor data include trip data of the vehicle from at least one acceleration sensor, at least one position sensor, and at least one velocity sensor, infrastructure data of infrastructure elements in a predefined environment of the vehicle from at least one environmental sensor, and object data of recognized traffic objects in the predefined environment from the at least one environmental sensor;
   determine an environmental model for behavior planning and maneuver planning of the vehicle within the predefined environment of the vehicle, wherein the environmental model is determined by simultaneous localization and mapping using the sensor data and a factor graph, wherein the sensor data are integrated as factors in the factor graph; and
   output the environmental model to an interface to a planning device for behavior planning and maneuver planning of the vehicle, wherein the planning device is configured to operate the vehicle, using the environmental model;
   wherein the apparatus is further configured to, as part of the determine an environmental model for behavioral planning and maneuver planning of the vehicle, continuously marginalize sensor data integrated as factors in the factor graph when the sensor data satisfies a predefined irrelevance criterion regarding a temporal and/or local validity of the sensor data.

7. A vehicle for highly automated driving, the vehicle comprising:
   an apparatus configured to operate the vehicle for the highly automated driving, the apparatus configured to:

read sensor data from an interface to a plurality of vehicle sensors of the vehicle, wherein the sensor data include trip data of the vehicle from at least one acceleration sensor, at least one position sensor, and at least one velocity sensor, infrastructure data of infrastructure elements in a predefined environment of the vehicle from at least one environmental sensor, and object data of recognized traffic objects in the predefined environment from the at least one environmental sensor, determine an environmental model for behavior planning and maneuver planning of the vehicle within the predefined environment of the vehicle, wherein the environmental model is determined by simultaneous localization and mapping using the sensor data and a factor graph, wherein the sensor data are integrated as factors in the factor graph, and output the environmental model to an interface to a planning device for behavior planning and maneuver planning of the vehicle, wherein the planning device is configured to operate the vehicle, using the environmental model;

the plurality of vehicle sensors; and the planning device for behavior planning and maneuver planning;

wherein the apparatus, the vehicle sensors, and the planning device are connected to one another for data transmission; and wherein the apparatus is further configured to, as part of the determine an environmental model for behavioral planning and maneuver planning of the vehicle, continuously marginalize sensor data integrated as factors in the factor graph when the sensor data satisfies a predefined irrelevance criterion regarding a temporal and/or local validity of the sensor data.

8. A non-transitory machine-readable storage medium on which is stored a computer program for operating a vehicle for highly automated driving, the computer program, when executed by a computer, causing the computer to perform the following steps:

reading sensor data from an interface to a plurality of vehicle sensors of the vehicle, wherein the sensor data include trip data of the vehicle from at least one acceleration sensor, at least one position sensor, and at least one velocity sensor, infrastructure data of infrastructure elements in a predefined environment of the vehicle from at least one environmental sensor, and object data of recognized traffic objects in the predefined environment from the at least one environmental sensor;

determining an environmental model for behavior planning and maneuver planning of the vehicle within the predefined environment of the vehicle, wherein the environmental model is determined by simultaneous localization and mapping using the sensor data and a factor graph, wherein the sensor data are integrated as factors in the factor graph; and outputting the environmental model to an interface to a planning device for behavior planning and maneuver planning of the vehicle, wherein the planning device is configured to operate the vehicle, using the environmental model;

wherein, in the determining step, sensor data integrated as factors in the factor graph are continuously marginalized when the sensor data satisfy a predefined irrelevance criterion regarding a temporal and/or local validity of the sensor data.

* * * * *